July 6, 1937.  A. B. WINCHELL  2,086,249
WINDSHIELD CLEANER MOTOR
Filed May 12, 1934  2 Sheets-Sheet 1

Witness
J. J. Mains

Inventor
Arthur B. Winchell
by
Hoguet and Neary
Attorneys

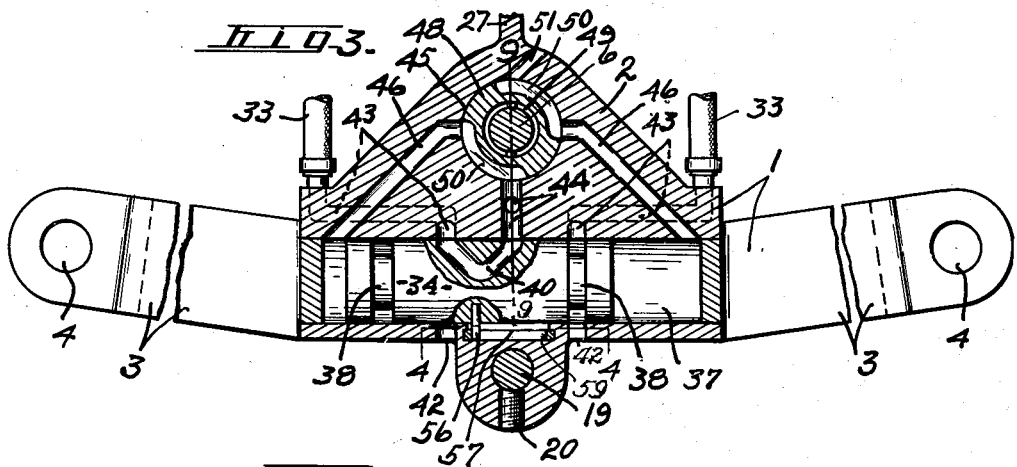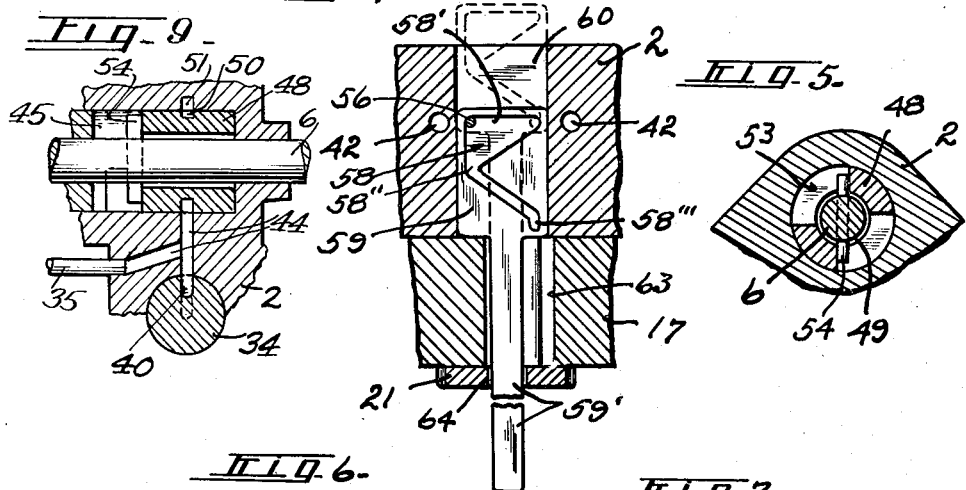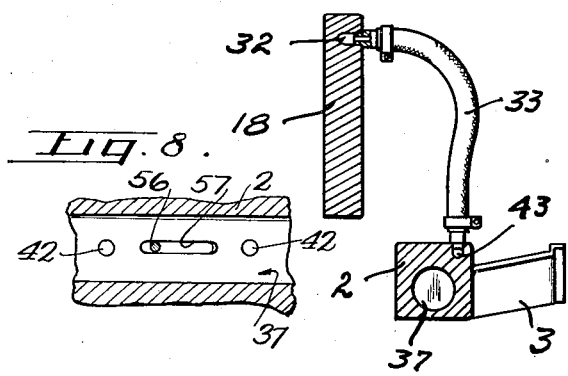

Patented July 6, 1937

2,086,249

UNITED STATES PATENT OFFICE 2,086,249

WINDSHIELD CLEANER MOTOR

Arthur B. Winchell, Jackson, Mich., assignor to The Sparks-Withington Company, Jackson, Mich., a corporation of Ohio Application May 12, 1934, Serial No. 725,321

13 Claims. (Cl. 121—48)

This invention relates to a windshield cleaner of the vacuum operated type in which the wiper blade is oscillated in a predetermined wiping zone.

Windshield cleaners of the above mentioned class as heretofore commonly constructed comprise a differential fluid pressure motor having a piston member operatively connected to the cleaner blade, and which is mounted to oscillate or to reciprocate in a suitable case or cylinder. This structure has resulted in a motor which rapidly decreases in efficiency after a comparatively short period of use, due to the difficulty of maintaining a fluid tight relationship between the piston and the wall of the piston chamber.

An object of the present invention is to provide a windshield cleaner motor adapted to be actuated by differential fluid pressure, and which is capable of long continuous service without any appreciable loss in efficiency.

Another object of the invention is to provide a new and improved automatic valve mechanism to alternately place the differential fluid pressure chambers of the motor in communication with a source of fluid operating pressure and with the atmosphere.

A further object of the invention is to provide a windshield cleaner of the differential fluid pressure type wherein the cleaner blade will be automatically moved to a position at one side of the wiping zone out of the line of vision when the motor is rendered inoperative.

A still further object of the invention is to provide a windshield cleaner of the above mentioned class with means whereby the cleaner element may be automatically parked in a position at either side of the wiping zone as determined by the operator.

A still further object of the invention resides in providing a windshield cleaner which is simple and economical in construction and is durable, strong and positive in operation.

In carrying out the above mentioned objects, I have provided a motor having a pair of opposed fluid-tight contractible and expansible chambers, having folding walls of the bellows type. These bellows or air chambers are arranged on either side of a stationary supporting frame member and between the arms of a rock member which is mounted on the frame for movement relative thereto. The rock member in turn is operatively connected with the windshield cleaner element for reciprocating said element. Air may be withdrawn from the bellows chambers by a vacuum pump, not shown, operated by a moving member of the vehicle upon which the windshield cleaner is mounted in the conventional manner, or as will be readily understood, other suitable means may be utilized for this purpose such as the suction created in the intake manifold of the vehicle engine.

In order that the bellows chambers may be alternately brought into communication with the source of fluid operating pressure and with the atmosphere, I have provided an automatic valve mechanism associated with the pressure chambers which is novel in construction and operation. I have eliminated the usual snap valve mechanism with the springs and multiplicity of small parts necessary to efficaciously effect the operation of the valve proper and have provided a very simply constructed mechanism in the suction line to the chambers. This valve mechanism consists of but three major members, first, a suction operated main supply valve for alternately bringing the pressure chambers into communication with the source of fluid operating pressure and with the atmosphere, second, a positively driven auxiliary control valve for controlling the suction action on the main supply valve, and, third, a simply constructed and operated control member associated with the main supply valve whereby the operation of the motor may be manually controlled.

Other objects and advantages pertaining to the construction of the device and to the form and relation of the parts thereof will more fully appear from the following description taken in connection with the accompanying drawings in which Figure 1 is a vertical sectional view taken substantially on line 1—1 Figure 2 illustrating a windshield cleaner mechanism embodying the various features of this invention.

Figure 3 is an enlarged vertical sectional view taken on line 3—3 Figure 2 in the plane of the automatic valve mechanism.

Figure 4 is a detail horizontal sectional view taken on line 4—4 Figure 3 illustrating the manually operated control member in elevation and with a portion of the outer end thereof broken away.

Figure 5 is an enlarged detail vertical sectional view taken on line 5—5 Figure 2.

Figure 6 is a detailed vertical sectional view taken on line 6—6, Figure 1.

Figure 7 is a fragmentary section view taken on line 7—7 Figure 2.

Figure 8 is an enlarged fragmentary horizontal sectional view through the body of the supporting frame taken substantially in the plane of the line 8—8, Figure 2, with the main control valve omitted and illustrating the exhaust ports and the elongated slot and pin associated with the valve chamber and the main control valve for governing the operation of said valve.

Figure 9 is a fragmentary sectional view taken on line 9—9, Figure 3.

Figure 1:
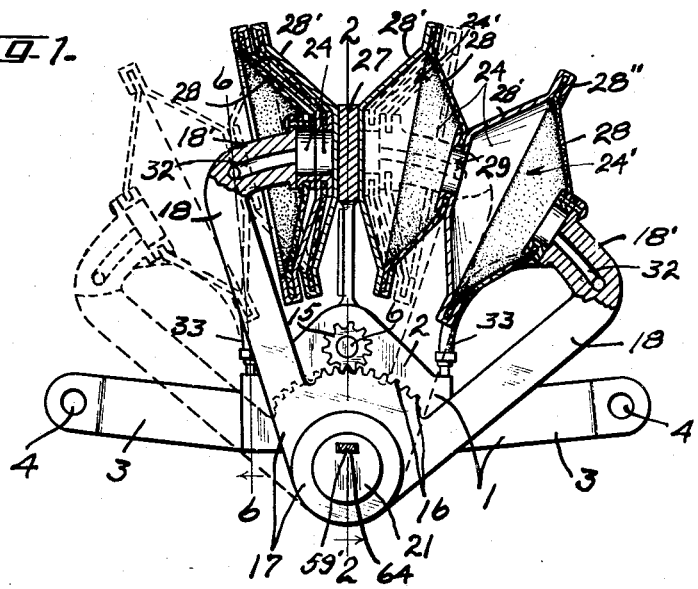

As illustrated in the drawings, the device consists of a supporting frame 1 comprising a body portion 2 and a pair of suitably constructed arms 3, adapted to extend outwardly in opposite directions from the body portion to engage the windshield frame as F, or other suitable member of the vehicle body adjacent the windshield glass. The outer end of each arm 3 is provided with a hole 4 adapted to receive therethrough a clamping screw or bolt for securing the frame in operative position adjacent the windshield.

Figure 2:
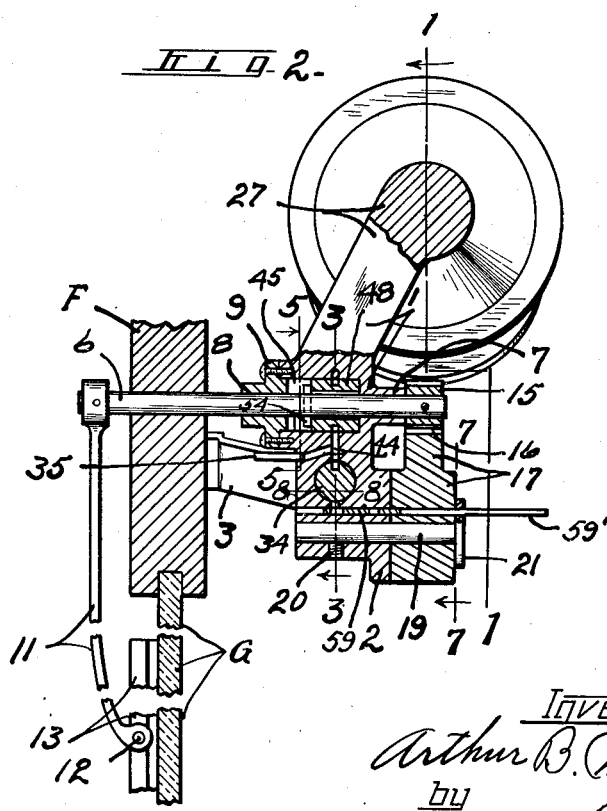
Figure 2 is a vertical sectional view taken substantially in the plane of the line 2—2 Figure 1 showing the windshield cleaner mounted adjacent a windshield and having a wiper arm assembly connected with the wiper shaft.

The wiper shaft 6 is journaled in the upper portion of the frame body 2 in suitable bearings 7 and 8, one of which as 7 is formed integral with the body 2 at one side thereof while the other bearing 8 is formed in a cap member 9 removably secured to the opposite side of the frame body 2 by screws or other suitable means. The wiper shaft 6 extends outwardly beyond each bearing 7 and 8 with one end, as shown in Figure 2, extending through the windshield frame F to support the cleaner arm assembly. The wiper arm assembly may be formed in any suitable manner and as illustrated in Figure 2 comprises a wiper arm 11 secured at one end to the shaft 6 to be oscillated thereby and has the other end connected as by pivot 12 or other suitable means to a wiper blade 13. The other end of the wiper shaft 6 has a pinion 15 secured thereto for meshing engagement with segmental gear or rack teeth 16 formed in this instance in an arcuate edge surface provided near the apex of a substantially V-shaped operating member 17 intermediate the arms 18 thereof.

This operating member 17 is journaled upon a stud 19 which passes through alined openings provided in the operating member 17 at the apex end thereof, and in the lower portion of the frame body 2. The stud is secured to the frame by means of a set screw 20 while the outer end of the stud is provided with a head 21 adapted to engage the outer adjacent surface of the operating member 17 to maintain said member against axial movement relative to the stud 19 with the teeth 16 in mesh with the pinion 15. The teeth 16 are formed concentric with the stud 19 so that any rocking movement of the operating member 17 upon the stud 19 will produce a corresponding movement of the pinion 15 and shaft 6.

The rocking or oscillatory movement of the operating member 17, in this instance, is effected by differential fluid pressure through the medium of a novel mechanism which comprises a pair of opposed bellows chambers 24. The wall of each chamber is secured at one end by spot welding or other suitable means to a respective side of a stationary wall or partition 27 secured to or made integral with the body portion 2 of the frame 1. This partition extends outwardly from the upper portion of the body 2 and at an angle thereto with the upper end thereof terminating in the vertical plane passing through the pinion 15 as illustrated in Figure 2.

The opposite or free end of each bellows chamber wall is secured by any suitable means in a fluid tight manner to the outer end of a respective arm 18 of the operating member 17. The wall of each chamber is, as shown, formed of a plurality of, in this instance, 4, hollow conical or, more accurately, irregular frusto-conical sections 28 and 28' positioned with the bases thereof extending substantially in radial planes about the axis of the stud 19 so that during the contraction and expansion of the bellows chambers, the sections of each wall will travel through the arc of movement of the ends of the arms 18. The end sections of each wall are arranged with the smaller base portion thereof positioned to form the respective end of the chamber with one of said base portions secured to the partition 27 of the supporting frame 1, while the base portion at the opposite end of the chamber is secured to the end of the adjacent arm 18 as previously stated.

These end sections and the intermediate sections 28 and 28' of each wall are arranged with the corresponding base portion of adjacent sections secured together so that when the walls are in the contracted position, said sections of each wall will lie in telescopic relation, with the outer positioned sections nesting within the adjacent inner positioned sections as clearly illustrated by full lines at the left hand side of Figure 1.

In order to permit this nesting of the wall sections, the outer end 18' of each arm 18 is extended inwardly toward the other arm at substantially right angles to the remaining portion of the arm.

It will now be noted by referring more particularly to the right hand side of Figure 1 that each bellows chamber 24 is composed of two sections 24' as defined by the wall sections having their major base portions secured together and that these chamber sections 24' are connected by an opening as 29 formed in the smaller base portions of the 2 intermediate wall sections 28 and 28'.

While the wall sections 28 and 28' may be all made from the same class of material which in that case would be flexible, I preferably form alternate sections as 28' of non-flexing thin metallic material such as sheet brass or the like so that said sections will maintain their normal form and support the remaining sections during the contraction and expansion of the bellows chambers. The remaining sections as 28 are preferably formed of flexible material such as rubberized fabric or other suitable material impervious to air and moisture and which will readily flex during the contraction and expansion of the bellows chambers. The wall sections 28 and 28' are secured to each other in any suitable manner to form a fluid tight chamber as by folding or crimping the marginal edges of the base portions of the metallic sections as at 28'', Figure 1 about the corresponding edge portion of the flexible sections.

Each bellows chamber 24 is provided with an air passage 32 leading therefrom and which, in this instance, is formed in the end portion 18' of the corresponding arm 18. The outer end of each air passage 32 is connected through the medium of a flexible conduit 33 and a main supply valve 34 with one end of a vacuum conduit 35 adapted to have the other end thereof connected with a suitable source of vacuum such as the intake manifold of the engine for operating the vehicle not shown.

The above mentioned main supply valve 34 in this instance is a cylindrical member mounted for longitudinal reciprocative movement in a fluid tight cylindrical valve chamber 37 formed in the frame body member 2 intermediate the wiper shaft 6 and the stud 19. The valve 34 as shown more clearly in Figure 3 is provided with a pair of annular grooves or channels 38 each positioned adjacent a respective end thereof in slightly spaced relation thereto to form fluid passages diametrically through the valve chamber 37. The valve 34 is also provided with a return-bend passage 40 formed in the upper portion thereof substantially midway between the channels 38. The valve chamber 37 is provided with a pair of exhaust ports 42 formed in the body portion 2 at the lower side of the valve chamber, while a pair of fluid passages 43 are formed in the body member 2 above the valve chamber 37. These fluid passages 43 have one end thereof communicating with the valve chamber 37 at the diametrically opposite side thereof to that at which the corresponding exhaust port 42 is located, while the other ends of these fluid passages are connected with one end of a respective hereinbefore mentioned flexible conduit 33 which have their other ends operatively connected with a respective air passage 32 formed in the arms 18. A vacuum passage 44 is formed in the body portion 2 of the frame 1 above the valve chamber 37 substantially midway between the fluid passages 43. This vacuum passage 44 is in this instance a T-shaped passage having one end connected with the vacuum conduit 35, another end of the vacuum passage 44 is in communication with the valve chamber 37 substantially midway between the ends thereof, while the third end of the passage 44 is in communication with an auxiliary valve chamber 45, formed in the upper portion of the frame body 2 in concentric relation with the wiper shaft 6 intermediate the bearing members 7 and 8. The frame body portion 2 is also provided with a pair of fluid passages 46 each communicating at one end with a respective end of the valve chamber 37 and at the other end with the auxiliary valve chamber 45 and at diametrically opposite sides thereof.

The relation of the ends of the passages 43 and the vacuum passage 44 communicating with the valve chamber 37 and the outer ends of the return-bend passage 40 are such that when the main supply valve 34 is at the limit of its stroke at either end of the valve chamber, the fluid passage 43 at said end of the valve chamber will be brought into communication by the return-bend passage 40 with the vacuum passage 44, while the fluid passage 43 communicating with the other end portion of the valve chamber will be connected with the corresponding exhaust port 42 by the channel 38 positioned at the inner end of the supply valve.

The hereinbefore mentioned auxiliary valve chamber 45 has journaled therein an auxiliary control valve member 48. This auxiliary valve as illustrated in the drawings, is a tubular member having a close operating fit in the chamber 45 while the central bore as 49 thereof is of sufficient diameter to loosely receive the wiper shaft 6 therethrough. The periphery of the valve 48 is provided with a pair of diametrically opposed circumferentially spaced passages 50, arranged in the plane of the vacuum passage 44. These valve passages 50 are of sufficient length circumferentially of the valve to alternately connect the fluid passages 46 leading to the ends of the valve chamber 37 with the vacuum passage 44. An exhaust port 51 is also provided in the body portion 2 at the upper end thereof with one end communicating with the auxiliary valve chamber 45 diametrically opposite the vacuum passage 44.

In order that the auxiliary valve 48 may be rocked by the wiper shaft 6 to alternately bring the ends of the valve chamber 37 in communication with the vacuum passage 44, one end of the auxiliary valve as the end adjacent the cap 9, is provided with a diametrically extending slot 53 adapted to receive therein the ends of a drive pin 54 which extends diametrically through the wiper shaft 6 as illustrated in Figures 2 and 5. The circumferential length of the slot 53 is such that the valve 48 will remain stationary during the initial movement of the wiper shaft 6 during each oscillation thereof, but will be actuated by the pin 54 as the wiper shaft 6 approaches the end of each oscillatory movement for sufficiently rotating the valve to cut off the communication of one of the passages 46 with the vacuum passage 44 and connecting said passage 46 with the exhaust port 51, while the other passage 46 will simultaneously be cut off from the exhaust port 51 and brought into communication with the vacuum passage 44.

It is now evident that the ends of the main supply valve 34 will thus be alternately brought under the influence of vacuum and atmosphere pressures and be reciprocated thereby from a position near one end of the valve chamber 37 with the return-bend passage 40 connecting one of the passages 43 with the vacuum passage 44 to a corresponding position at the opposite end portion of the valve chamber where the return-bend passage 40 will bring the vacuum passage 44 into communication with the other fluid passage 43.

This reciprocatory movement of the supply valve 34 in the chamber 37 is limited by means of a pin 56 secured in the lower portion of the valve 34 and which extends downwardly through an elongated slot 57 provided in the lower wall of the chamber 37 into a cam recess 58 provided in a cam plate 59 slidably mounted in a horizontal channel 60 provided in the frame body 2 beneath the valve chamber 37. The length of the slot 57 is greater than the axial movement of the valve 34 to permit the free movement thereof while the width of the slot is substantially equal to the diameter of pin 56 as shown in Figure 8 for coacting with said pin for preventing rotation of the valve in chamber 37.

The cam recess 58 is provided with a triangular portion 58' at the inner end of the plate and which has the base portion thereof extending transversely of the plate 59 in parallel relation with the direction of movement of the supply valve 34. The length of this base portion of the cam recess is such that when the pin 56 is at either end thereof, the valve 34 will be maintained thereby in such a position in the valve chamber 34 that the return-bend passage 40 will be in proper relation with the vacuum passage 44 and fluid passages 43 to bring one or the other of said fluid passages into communication with the vacuum passage.

The cam recess 58 is further formed with a narrow passage adapted to receive the pin 56 therethrough. This passage connects at one end with the inner end of portion 58' as at 58'' in alinement longitudinally of the plate with one end of the base of the triangle portion.

This passage or channel portion of the recess continues outwardly from the portion 58" transversely of the plate and at an angle thereto to the opposite side of the plate where it terminates in a relatively short portion 58'" extending longitudinally of the plate in line with the corresponding end of the base portion 58' of the recess. The cam plate or slide 59 is formed with a reduced outwardly extending handle portion as 59' which extends outwardly through an arcuate slot 63 provided in the operating member 17 and through a suitable slot 64 provided in the head 21 of the stud 19. The slot 63 in the operating member 17 is of such a length as to permit the free rocking movement of the operating member relative to the plate member 59' without coming into contact with said plate member.

It will now be apparent that when the cam plate 59 is in its outermost position, as shown by full lines in Figure 4 with the pin 56 positioned in the base of portion 58' of the cam recess 58, the control valve is free to reciprocate from one end of its movement to the other end, as determined by the length of the base of portion 58' of the cam recess, as suction is alternately applied to the ends of the valve as determined by the auxiliary control valve 48. When it is desired to stop the operation of the windshield cleaner motor, this may be readily effected by manually moving the cam plate 59 inwardly until the portion 58" of the cam recess is brought into the path of movement of the pin 56, at which position of the cam plate the valve 34 will be maintained at the corresponding end of the valve chamber 37 against the action of the suction produced in the opposite end of the valve chamber 37. As the main supply valve 34 is thus maintained at one end of the valve chamber, the corresponding bellows chamber will be continuously maintained in communication with the vacuum passage 44 through the medium of the return-bend passage 40 and the respective flexible conduit 33 and passage 46, so that the walls of said bellows chamber will remain in the folded position with the result that the cleaner element or blade 13 will be maintained at one side of the wiping zone out of the line of vision.

If, however, it is desired that the windshield cleaner element 13 be maintained at the opposite side of the wiping zone when the windshield cleaner mechanism is rendered inoperative, it is only necessary for the operator to manually move the cam plate 59 inwardly until the end of the pin 56 registers in the portion 58'" of the cam recess at which position of the pin the control valve 34 will be maintained at the opposite end of the valve chamber 37 with the return-bend passage 40 connecting the passage 43 at that end of the frame body 2 with the vacuum passage 44, with the result that the bellows chamber connected with this fluid passage will be maintained in a contracted position.

Operation

It will now be obvious that when the cam plate 59 is in the outermost position as illustrated by full lines in Figure 4 of the drawings, the main supply valve 34 is free to reciprocate in the valve chamber 37 due to the pin 56 registering with the elongated base portion 58' of the cam recess 58.

It will also be understood that when the suction conduit 35 is connected with a source of vacuum and the auxiliary control valve 48 is in the position illustrated in Figure 3 of the drawings so that the left hand end of the valve chamber 37 is in communication with the vacuum passage 44 and, therefore, with the vacuum conduit 35, a partial vacuum will be maintained at the left hand end of the chamber 37 while atmospheric pressure will be maintained at the opposite end of the chamber. This produces a differential pressure upon the main supply valve 34 which will move said valve 34 to its extreme position of movement at the left hand end of the chamber 37. As the valve 34 approaches its position at the left hand end of the chamber 37, the bellows chamber at the left hand side of the fixed partition, 27, as viewed in Figure 1, will be brought into communication through the medium of the flexible conduit 33, passage 43, and return-bend passage 40 with the vacuum passage 44. This will cause the walls of said bellows chamber to become collapsed and produce a rocking movement of the operating member 17 about the stud 19 as a pivot.

This rocking of the member 17 will cause the walls of the bellows chamber positioned at the right hand side of the partition 27 to move to the extended position and at the same time produce a corresponding swinging movement of the wiper arm 11 and blade 13 due to the action of the rack teeth 16 upon the pinion 15 and wiper shaft 6.

As the wiper shaft 6 is thus caused to rotate, the auxiliary control valve 48 will be engaged by the pin 45 as the shaft 6 approaches the end of its rotary movement and be shifted from the position shown in Figure 3 to the opposite position where the passages 50 of the valve will bring the fluid passage 46 at the right hand side of the body 2, as viewed in Figure 3, in communication with the vacuum passage 44. At the same time the passage 43 at the left hand side of the body 2 will be cut off from the vacuum passage 44 and be brought into communication with the exhaust port 51.

As the auxiliary control valve 48 approaches this second position, the right hand end of the valve chamber 37 will obviously be brought into communication with the source of vacuum pressure while the left hand end of the said chamber will be connected with the atmospheric pressure, with the result that the differential pressures thus produced on the main supply valve 34 will cause said valve to move longitudinally from the left hand side of the chamber 37 to the right hand side thereof.

As the valve 34 approaches its extreme right hand position in the chamber 37, the bellows chamber 24 at the right hand side of the partition 27 will be brought into communication with the source of vacuum, while the bellows chamber at the opposite side of the partition 27 will be connected with the atmosphere. The operating means 17 will be thereby rocked about the axis of the stud 19 to its original position as shown in dotted lines in Figure 1, thus causing a corresponding oscillating movement of the wiper blade assembly, and the wiper shaft 6 connected therewith. As the wiper shaft 6 again approaches the limit of its rotary movement, the auxiliary control valve 48 will again be rocked in the chamber 45 until the atmospheric and vacuum pressures in the ends of the valve chamber 37 is reversed and the main supply valve 34 is again moved to the limit of its other position in said chamber to again reverse the positions of the bellows chambers 24 and operating member 17.

These cycles of movement of the valves 34 and 48 and chambers 24 and the operating arm 17 will continue as long as the conduit 35 is connected with the source of vacuum.

When it is desired to discontinue the operation of the windshield cleaner, this may be readily accomplished by merely moving the cam plate 59 inwardly to bring the portion 58″ or the portion 58‴ into registration with the path of movement of the pin 56. This will maintain the valve 34 at the corresponding end of its path of movement, with the result that one or the other of the bellows chambers 24 will be continuously maintained in communication with the source of vacuum and the wall of said chamber will be held in the folded position, while the wiper arm assembly will be maintained thereby at one side of the wiping zone.

Although I have shown and particularly described the preferred embodiment of my invention, I do not wish to be limited to the exact construction shown as various changes both in the form and relation of the parts thereof may readily be made without departing from the spirit of the invention as set forth in the appended claims.

I claim:

1. A windshield cleaner motor adapted to be operated by fluid pressure for actuating the cleaning element comprising a supporting means, opposed arcuate fluid chambers having a common center, each chamber having a plurality of folding walls movable into and out of nesting relation with each other, means securing the walls of each chamber to the supporting means in co-axial relation with each other whereby said walls may swing into and out of said nesting relation, an operating member pivotally connected to the supporting means in co-axial relation with the walls of the fluid chambers and adapted to be rocked by said walls during the folding operation thereof, means operatively connecting the operating member with the cleaning element, and means including a valve element actuated by fluid pressure for alternately connecting the fluid chambers to a source of fluid pressure.

2. A windshield cleaner motor adapted to be operated by fluid pressure comprising a supporting member having a fixed wall, a pair of opposed arcuate fluid chambers having a common center and arranged one at either side of the fixed wall, each chamber having a plurality of folding wall members movable into and out of nesting relation with each other, means securing one end of each chamber wall to the fixed wall, an operating member fixedly secured to the free ends of the wall of the fluid chambers, means pivotally connecting the operating member to the supporting means at one side of the chamber walls whereby said operating member will be rocked by said walls during the folding operation thereof, a wiper shaft journaled in the supporting means in a plane parallel with and at one side of said pivotal connecting means, means operatively connecting the operating member with the wiper shaft, and means including separate fluid passages connected respectively with the atmosphere and with the fluid chambers and a valve associated with said passages for alternately connecting the fluid chambers to a source of suction and with the atmosphere.

3. A windshield cleaner motor adapted to be operated by fluid pressure for oscillating a wiper shaft comprising air chambers having folding walls mounted for swinging movement about a common center, means comprising a rock member mounted co-axially with the chamber walls operatively connecting said walls with the wiper shaft, a conduit for connection with a source of fluid pressure, a main supply valve controlling the flow of fluid through said conduit to alternately place each air chamber in communication with the conduit and with the atmosphere, an auxiliary control valve mounted co-axially with the wiper shaft and operatively connected therewith to alternately place opposite ends of the main supply valve in communication with said conduit, and manually operated means associated with the main supply valve for controlling the operation of the motor.

4. A windshield cleaner motor adapted to be operated by fluid pressure comprising expansible and contractible wall members defining substantially fluid-tight chambers, operating means operatively connecting the wall members with a wiper element, a conduit for connection with a source of fluid pressure, valve means for alternately placing said chambers in communication with said conduit comprising a main supply valve actuated by fluid pressure, a positively driven auxiliary valve for controlling the operation of the main supply valve, and manually operated means connected with one of said valves independently of said fluid pressure and of said operating means for controlling the operation of the valve means.

5. A windshield cleaner motor adapted to be operated by fluid pressure comprising a wiper shaft, a pair of fluid chambers, operating means operatively connected with the wiper shaft and actuated by pressure in said chambers for oscillating said shaft, a conduit for connection with a source of fluid pressure, a main supply valve mounted independently of said shaft and said operating means for controlling the passage of fluid through said conduit to alternately place the chambers in communication with the conduit and with the atmosphere, and an auxiliary valve means mounted independently of the operating means and intermittently operated by the wiper shaft to alternately place opposite ends of the main supply valve in communication with said conduit.

6. A windshield cleaner motor adapted to be operated by fluid pressure, a shaft, fluid pressure chambers, means operatively connected with the shaft and actuated by pressure in said chambers for oscillating said shaft, a conduit for connection with a source of fluid pressure, a main supply valve mounted independently of said shaft and said oscillating means for controlling the passage of fluid through said conduit to alternately place the chambers in communication with said conduit and with the atmosphere, an auxiliary valve means intermittently operated by the shaft to alternately place opposite ends of the main supply valve in communication with said conduit, and manually operated means for maintaining the supply valve in a predetermined position against the action of said pressure.

7. A windshield cleaner motor adapted to be operated by fluid pressure comprising expansible and contractible wall members defining substantially fluid-tight chambers, means operatively connecting the wall members with a wiper shaft to produce an oscillatory movement of said shaft, a conduit for connection with a source of fluid pressure, and valve means mounted independently of said shaft and said oscillating means for alternately placing said chambers in communication with said conduit and with the atmosphere comprising a reciprocating main supply valve actuated by fluid pressure, an auxiliary valve operated by the wiper shaft for alternately placing opposite ends of the supply valve in communication with the conduit and with the atmosphere, and cam means connected to the main supply valve independently of said fluid pressure whereby the operation of the motor may be manually controlled.

8. A motor for a windshield cleaner or the like adapted to be operated by fluid pressure, and wherein a supporting means has a wiper operating member supportably connected therewith for movement with respect thereto and a pair of pressure chambers having a movable actuating means associated therewith are mounted on the supporting means in opposed relation to each other and in a plane at one side of the operating member, and wherein a fluid conduit for connection with a source of fluid pressure and a fluid exhaust passage for said pressure chambers are associated with the support, said motor being characterized by a main supply valve actuated by fluid pressure mounted in the supporting means for controlling the passage of pressure fluid through said conduit to alternately place the chambers in communication with said conduit and with the exhaust passage, control means for operating said main supply valve including an auxiliary valve connected with the supporting means for movement with respect thereto, fluid passages in said support in uncommunicative relation with the pressure chambers operatively connecting the auxiliary valve with the main supply valve and with said fluid conduit, and transmission means mounted exteriorly of the pressure chambers operated by said actuating means for actuating the operating member and the auxiliary valve, said transmission means including drive and driven elements having a lost motion therebetween during a portion only of the movement of the drive element whereby said actuation of the auxiliary valve will be intermittently effected.

9. A motor for a windshield cleaner or the like, adapted to be operated by fluid pressure and wherein a supporting means has a wiper operating member journaled therein and a pair of pressure chambers having a movable actuating means associated therewith are mounted on the supporting means in opposed relation to each other and in a plane at one side of the operating member and wherein a fluid conduit for connection with a source of fluid pressure and a fluid exhaust passage for said pressure chambers are associated with the support, said motor being characterized by a main supply valve actuated by fluid pressure mounted in the supporting means for controlling the passage of pressure fluid through said conduit to alternately place the chambers in communication with said conduit and with the exhaust passage, means operated by the movement of said actuating means for actuating the wiper operating member and for controlling the application of fluid pressure to the main supply valve, and manually operated means independent of the fluid conduit and wiper operating member for arresting the operation of the main supply valve against the action of said fluid pressure to maintain a constant pressure in the pressure chambers.

10. A motor for a windshield cleaner or the like, adapted to be operated by fluid pressure and wherein a supporting means has a wiper operating member journaled therein and a pair of pressure chambers having a movable actuating means associated therewith are mounted on the supporting means in opposed relation to each other and in a plane at one side of the operating member and wherein a fluid conduit for connection with a source of fluid pressure and a fluid exhaust passage for said pressure chambers are associated with the support, said motor being characterized by a main supply valve actuated by fluid pressure mounted in the supporting means for controlling the passage of pressure fluid through said conduit to alternately place the chambers in communication with said conduit and with the exhaust passage, and means operated by the movement of said actuating means for actuating the wiper operating member and for controlling the application of fluid pressure to the main supply valve, said latter means including an auxiliary control valve, a manually operated control means mounted in the supporting means independently of the fluid conduit and of the wiper operating member, and cooperating means associated with said control means and one of the valves for arresting the operation of said main supply valve against the action of said fluid pressure whereby a constant pressure will be maintained in the pressure chambers.

11. A motor for a windshield cleaner or the like, adapted to be operated by fluid pressure and wherein a supporting means has a wiper operating member journaled therein and a pair of pressure chambers having a movable actuating means associated therewith are mounted on the supporting means in opposed relation to each other and in a plane at one side of the operating member and wherein a fluid conduit for connection with a source of fluid pressure and a fluid exhaust passage for said pressure chambers are associated with the support, said motor being characterized by a main supply valve actuated by fluid pressure mounted in the supporting means for controlling the passage of pressure fluid through said conduit to alternately place the chambers in communication with said conduit and with the exhaust passage, means operated by the movement of said actuating means for actuating the wiper operating member and for controlling the application of fluid pressure to the main supply valve, and a manually operated control means connected with the main supply valve adapted when in one position to limit the operative movement of the main supply valve and when in another position to arrest said valve against the action of said fluid pressure whereby a constant pressure will be maintained in the pressure chambers.

12. A motor for a windshield cleaner or the like, adapted to be operated by fluid pressure and wherein a supporting means has a wiper operating member journaled therein and a pair of pressure chambers having a movable actuating means associated therewith are mounted on the supporting means in opposed relation to each other and in a plane at one side of the operating member and wherein a fluid conduit for connection with a source of fluid pressure and a fluid exhaust passage for said pressure chambers are associated with the support, said motor being characterized by a main supply valve actuated by fluid pressure mounted in the supporting means for controlling the passage of pressure fluid through said conduit to alternately place the chambers in communication with said conduit and with the exhaust passage, means operated by the movement of said actuating means for actuating the wiper operating member and for controlling the application of fluid pressure to the main supply valve, and manually operated control means connected with the main supply valve adapted to selectively arrest said supply valve in one of the two positions, to maintain a corresponding constant pressure in the pressure chambers.

13. A fluid pressure motor for operating a windshield cleaner element or the like comprising fluid pressure chambers, operating means associated with said chambers adapted to be operated by fluid pressure for actuating said cleaner element, a conduit for connection with a source of fluid pressure, valve means for alternately placing said chambers in communication with said conduit comprising a main supply valve actuated by fluid pressure, a positively driven auxiliary valve for controlling the operation of the main supply valve, and manually operated means connected with one of said valves independently of said fluid pressure and of said operating means for controlling the operation of the valve means.

ARTHUR B. WINCHELL.